United States Patent [19]

Mitchell

[11] 4,063,387
[45] Dec. 20, 1977

[54] HANGING PLANTER POT SPEAKER ENCLOSURE

[76] Inventor: Thomas R. Mitchell, 6549 Magnolia Ave., Riverside, Calif. 92506

[21] Appl. No.: 754,596

[22] Filed: Dec. 27, 1976

[51] Int. Cl.² .............................................. A01G 9/02
[52] U.S. Cl. ..................................... 47/67; D11/144; 179/1 E
[58] Field of Search ......................... 179/1 E; 181/143; D11/144; 47/66, 67, 39, 58

[56] References Cited

U.S. PATENT DOCUMENTS

| 777,419 | 12/1904 | Hoyt et al. | 47/67 |
| 3,854,212 | 12/1974 | Gladstein | 47/66 |
| 3,912,866 | 10/1975 | Fox | 179/1 E |
| 3,915,419 | 10/1975 | Brown | 47/67 |
| 4,001,959 | 1/1977 | Grendahl | 47/39 X |

FOREIGN PATENT DOCUMENTS

| 916,842 | 12/1946 | France | 179/1 E |
| 1,199,013 | 12/1959 | France | 181/143 |
| 439,009 | 11/1935 | United Kingdom | 179/1 E |

Primary Examiner—Edgar S. Burr
Assistant Examiner—James R. Feyrer
Attorney, Agent, or Firm—Herbert E. Kidder

[57] ABSTRACT

A hanging planter pot speaker enclosure for stereo or monaural music systems comprising a hollow ceramic housing enclosed on all sides and having openings at the top and bottom. A planter pot is set down into the top opening of the housing, and has a radially outwardly extending flange around its top edge that seats on the marginal edge of the top opening to support the pot, while at the same time forming a seal that closes the top opening. Mounted within the housing below the planter pot is a cone-type speaker that faces downwardly so that sound radiating from the speaker is projected downwardly through the bottom opening. The speaker is sealed to the inner wall of the housing around its entire periphery, so that the space within the housing between the speaker and the pot is entirely sealed. Air contained within this sealed space serves as a pneumatic spring, backing up the speaker cone to improve its response. Suspended below the bottom opening of the housing is a horizontal diffuser, that deflects the sound from the speaker horizontally outward in all directions.

7 Claims, 2 Drawing Figures

HANGING PLANTER POT SPEAKER ENCLOSURE

BACKGROUND OF THE INVENTION

The present invention pertains generally to speaker enclosures for stereo or monaural music systems. Heretofore, the speakers for music systems have been mounted in the ceilings or walls of the rooms, or within separate enclosure boxes placed in various parts of the room. The speakers or enclosure boxes are visible, and the source of the music is immediately apparent to anyone present in the room. Moreover, speaker enclosure boxes are usually not suitable for permanent placement in exposed patios or garden areas, due to the fact that they will not withstand exposure to rain. Another disadvantage of conventional speaker enclosures is that they are usually made of plywood or particle board, and are frequently troubled with vibration of the panels, which are relatively lightweight and flimsy, and this causes a serious degradation of the sound quality.

SUMMARY OF THE INVENTION

The primary object of the present invention is to provide a speaker enclosure embodied within a hanging planter pot, wherein the speaker is entirely concealed, and the sound appears to emanate from the ornamental plant contained within the pot.

Another object of the invention is to provide a speaker enclosure made of ceramic pottery material, which is dense and relatively heavy, and which is quite stiff and non-resonant, so that spurious vibration of the enclosure walls is completely eliminated.

A further object of the invention is to provide a hanging planter pot speaker enclosure that is simple and inexpensive to manufacture, as well as ornamental in appearance. These and other objects and advantages of the present invention will become apparent to those skilled in the art from the following detailed description of the preferred embodiment thereof, with reference to the accompanying drawings.

Figure 1:
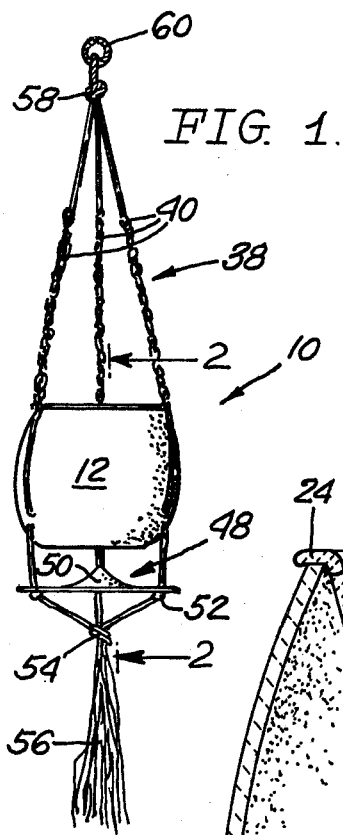
FIG. 1 is an elevational view of a hanging planter pot speaker enclosure embodying the invention.

DESCRIPTION OF THE PREFERRED EMBODIMENT:

In the drawings, the reference numeral 10 designates in its entirety a hanging planter pot speaker enclosure constructed in accordance with the invention. The unit 10 comprises a hollow, generally globe-shaped housing 12 made of fired ceramic pottery material and having circular top and bottom openings 14 and 16, respectively.

Inserted down into the interior of the housing 12 through the top opening 14 is a planter pot 18, also of fired ceramic pottery material. The planter pot 18 has the usual conically tapered side walls 20 and flat bottom 22. Around the top edge of the side walls 20 is a radially outwardly extending flange 24 that rests on top of the housing walls along the edge of the top opening 14.

Mounted within the housing 12 below the planter pot 18 is a speaker 26 having a frame 28, magnet housing 30, and cone 32. The frame 28 includes an annular mounting flange 34 around the outer edge of the cone, which rests on the inner surface of the housing 12, just a short distance back from the marginal edges of the bottom opening 16. A bead of cement 36 (such as epoxy, for example) around the periphery of the mounting flange 34 bonds the speaker securely to the housing.

The planter pot speaker enclosure 10 is adapted to be suspended by a macrame hanger 38 consisting of three strands of knotted rope 40 that pass down over the outside of the housing 12 at equally spaced intervals and pass inwardly through holes 42, then outwardly again through holes 44. On the inside of the housing 12, the ropes are knotted at 45 to prevent them from slipping out through the holes 42, and the housing 12 is thus securely attached to the ropes. From holes 44, the ropes 40 hang straight downwardly and pass through holes 46 in the marginal edge of a horizontal diffuser 48.

Diffuser 48 is also made of fired ceramic pottery material, and is preferably in the form of a circular plate that is flat at its outer edge portion, with a raised conical elevation 50 at its center. The diffuser 48 is centered with respect to the bottom opening 16, and serves to divide and deflect the sound emanating from the speaker 26, so that it radiates horizontally outward in all directions. The cross-sectional area of the gap between the diffuser 48 and the housing 12 expands as the distance increases radially outward from the center, and this has the effect of an exponential horn in coupling of the audio output of the speaker to the surrounding atmosphere. High frequencies, in particular, are deflected horizontally outward to the listening area with a minimum of attention.

Directly below the diffuser 48, the ropes 40 are knotted at 52 so that they will not slip upwardly through the holes 46, and the diffuser is thus supported by the ropes. The ropes are then brought together and knotted at 54, terminating finally in an ornamental tassel.

Figure 2:
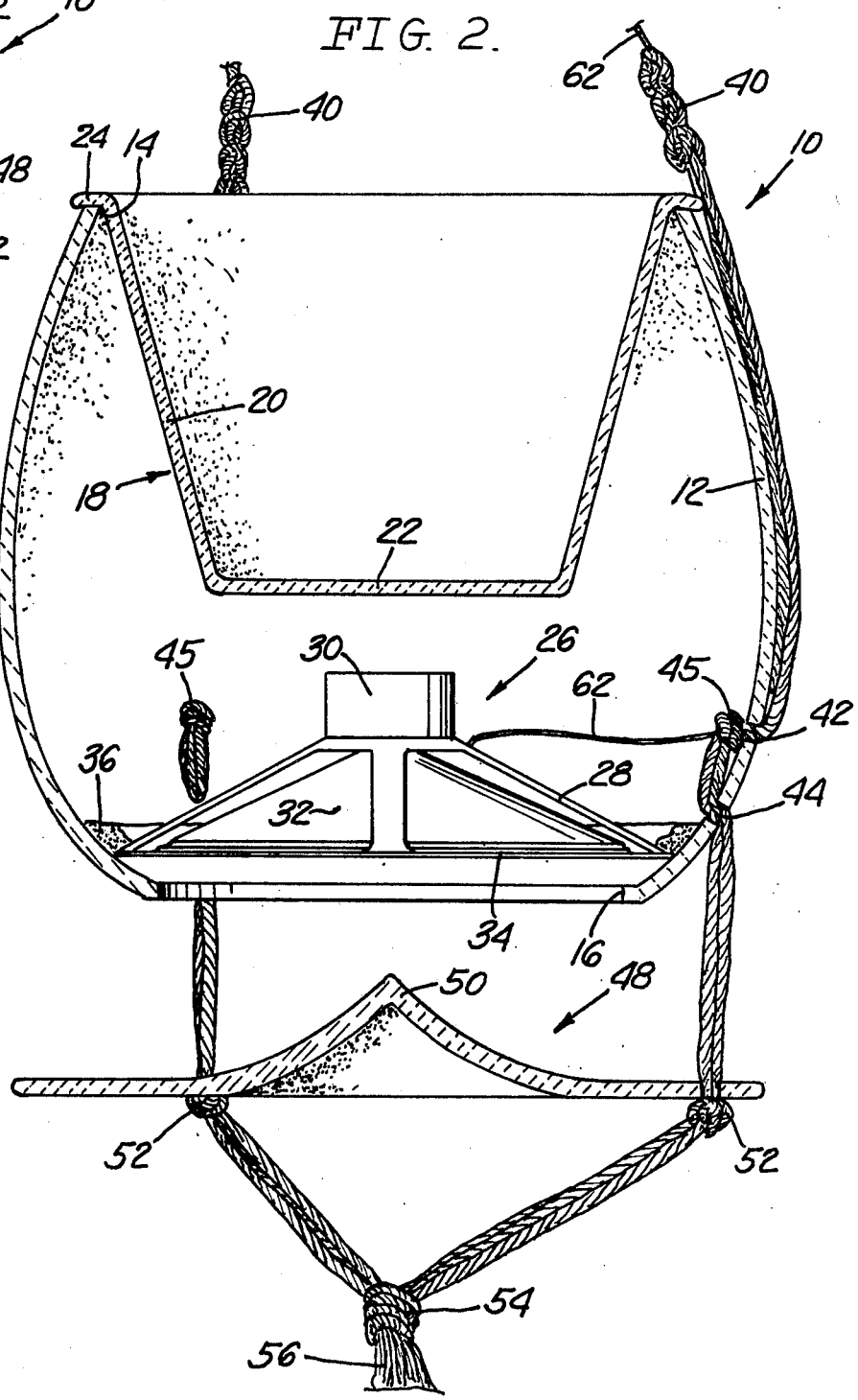
FIG. 2 is an enlarged cross-sectional view through the above, taken at 2—2 in FIG. 1.

Above the housing 12, the ropes 40 converge and are knotted together at 58, and attached to the top end of the ropes is a hanging ring 60, which is usually slipped over a hook or nail. As shown in FIG. 2, wire 62 from the speaker 26 joins one of the ropes 40 and passes upwardly alongside the latter to the hanging ring 60, where it is connected to the speaker wire of the music system.

The mode of operation of the invention is believed to be clearly evident from the foregoing description and the drawings. The planter pot 18 can be filled with a living, ornamental plant, or with an artificial plant. If a living plant is used, the potting soil would preferably be placed in another pot slightly smaller than pot 18 and having a drainage hole in the bottom, so that any excess water could drain into the bottom of pot 18, and thereby save the plant from becoming waterlogged. Pot 18 is removable from the housing 12, and can be lifted out for draining or cleaning.

When the planter pot 18 is in place, as shown in FIG. 2, the interior of the housing is entirely sealed, and the air trapped inside serves as a pneumatic spring behing the speaker cone 32. As a result, the speaker 26 produces musical sound of extremely high fidelity. The quality of the sound is further enhanced by the fact that the housing 12, planter pot 18, and diffuser 48 are all made of fired ceramic pottery material. Ceramic pottery material is a heavy, dense material that is relatively "dead" as far as vibration is concerned, and therefore it produces no spurious vibrational sound to degrade the music, as commonly happens with speaker enclosures made of plywood, particle board, or plastic. The globular shape of the housing 12 also contributes to its vibrational stiffness.

While I have shown and described in considerable detail what I believe to be the preferred form of my invention, it will be understood by those skilled in the art that the invention is not limited to such details, but may take various other forms within the scope of the claims.

What I claim is:

1. A planter pot speaker enclosure comprising:
   a hollow housing enclosed on all sides and having openings at the top and bottom thereof;
   a planter pot supported by said housing and extending down into the interior thereof through said top opening, said planter pot engaging said housing to form a tight seal therewith so that the planter pot forms a closure for the top opening;
   a speaker mounted within said housing below said planter pot, said speaker facing downwardly so that sound radiating from the speaker is projected downwardly through said bottom openings; and
   a horizontal diffuser mounted below said bottom enclosure to deflect the sound horizontally outward in all directions.

2. A planter pot speaker enclosure as set forth in claim 1, wherein said housing is formed of fired ceramic material.

3. A planter pot speaker enclosure as set forth in claim 1, wherein said speaker has a cone that is exposed on its back side; and said speaker being sealed to the inner surface of the housing around its entire periphery so that air contained within the housing serves as a pneumatic spring backing up the speaker cone to improve the response thereof.

4. A planter pot speaker enclosure as set forth in claim 1, wherein said housing is suspended by a hanger consisting of a plurality of ropes, each of which passes through an opening in the housing and is knotted so as to secure the housing to the rope; and sais speaker having an electrical wire that joins one of said ropes and follows the same upwardly to the support from which said hanger is suspended.

5. A planter pot speaker enclosure as in claim 4, wherein said ropes depend from the bottom of said housing and are attached to said diffuser so as to support the latter.

6. A planter pot speaker enclosure as in claim 1, wherein said housing, said planter pot and said horizontal diffuser are all made of fired ceramic pottery material, said speaker having a cone that is exposed on its back side, and said speaker sealed to the inner surface of said housing around its entire periphery so that the air contained within the housing serves as a pneumatic spring backing up the speaker to improve the response thereof.

7. A planter pot speaker enclosure as in claim 6, wherein said housing is suspended by a macrame hanger consisting of a plurality of ropes, each of which passes through an opening in the housing and is knotted to secure the housing to the rope; and said speaker having an electrical wire that joins one of the ropes and follows the same upwardly to the top end of the macrame hanger; said ropes depending from the bottom of said housing and being attached to said diffuser so as to support the latter.

* * * * *